Patented Apr. 24, 1928.

1,667,272

UNITED STATES PATENT OFFICE.

HAROLD HARDY SMITH, OF JOHANNESBURG, SOUTH AFRICA, ASSIGNOR TO MINERALS SEPARATION NORTH AMERICAN CORPORATION, OF NEW YORK, N. Y., A CORPORATION OF MARYLAND.

PROCESS FOR THE PRODUCTION OF GAS.

Application filed September 14, 1922. Serial No. 588,127.

This invention relates to the production of gas, and is herein disclosed as a process for the production of a gas consisting largely of hydrogen sulphide, carrying carbon dioxide and some other substances in gaseous and vapor form and which is especially adapted to be used for treating ores for froth-flotation purposes.

As disclosed herein, the gas may be produced from relatively cheap and naturally occurring sulphides, such as sulphide of iron, or the sulphides of copper which form the common ores of copper. For this purpose it is advantageous to have the sulphide material fairly finely ground, since the reactions to a large extent seem to be in the nature of surface reactions.

To obtain the desired type of gas and to prevent the evolution of sulphur vapor, the sulphide or sulphur-bearing material is mixed with carbon and then heated to a relatively low temperature but sufficiently to cause a reaction between it and steam, which is now blown through it. The temperature may then be raised gradually to the maximum suitable for the reaction, discharging the gases all the time from a hotter part of the zone of reaction. This procedure enables any deleterious results to be avoided which might arise from passing over free sulphur or over relatively cooler sulphur-bearing material the hydrogen-sulphide-bearing gas which has been formed. These results may be obtained either intermittently or continuously.

Other features and advantages will hereinafter appear.

In the accompanying drawings—

Figure 1 shows an apparatus suitable for evolving the hydrogen-sulphide-bearing gas from a closed retort and collecting it. The retort being afterwards recharged to produce another lot of gas.

Figure 2 is a sectional side view of an apparatus for the continuous production of the gas.

Figure 3 is a plan view of the apparatus of Figure 2.

Figure 4 is a sectional end view of the same apparatus.

In the procedure as carried on in the apparatus shown in Figure 1, steam is generated in a boiler 1 and conveyed by a pipe 2 having a valve 3 so that the steam is conveyed to the bottom of a retort 4 within which is piled a mixture of sulphur-bearing material, such as sulphide copper ore, preferably crushed to pea size and free from dust. The material retained on a twenty mesh sieve (Tyler standard) has been found very satisfactory. With this crushed ore was mixed rather less than 20% of its weight of charcoal or other carboniferous material in pieces of approximately the same size; the mixture being supported by a wire netting 5 laid across the bottom of the retort to prevent the pipe 2 from being blocked.

Above this mixture is placed a second wire netting 6, and above the netting 6 a layer of lime, or limestone, or residual lime from a previous run, this lime material amounting to about 10% of the total charge below the wire netting 6. It has been found that these various forms of lime are almost equally efficient for the purpose which will be described more in detail later on. When the retort is thus filled, its top 7 is bolted down by bolts 8 passing through flanges 9 of a usual form. A pipe 10 through the top 7 conveys away the gases produced. It has been found advisable to have the total content of sulphur in the mixture beneath the netting 6 less than 30% of the mixture. If the sulphur-bearing material used produces a mixture of greater sulphur content, it has been found advisable to mix inert material therewith, such as quartz or the gangue of ores.

The retort 4 is externally heated and to this end is shown as standing within an open topped furnace 11, with charcoal packed around the retort between the retort and the walls of the furnace 11. The furnace is preferably started by igniting the charcoal at the top and the steam turned on by opening the valve 3. The steam is preferably carried through a short section 12 of the pipe 2 within the furnace and to some extent subjected to the heat thereof with superheating action. I have found in the use of this apparatus that the retort produced the best gas when heated by the furnace 11 so that its temperature varied from about 400° C. at the bottom near the netting 5, to about 700° C. at the top near the netting 6, the fire having been controlled by vents 13 of a kind usually found in such furnaces.

Patented Apr. 24, 1928.

1,667,384

UNITED STATES PATENT OFFICE.

CHARLES FRANCIS JENKINS, OF WASHINGTON, DISTRICT OF COLUMBIA.

GRID-LEAK CELL CIRCUIT.

Application filed October 22, 1924. Serial No. 745,211. REISSUED

This invention relates to radio circuits in which a light-sensitive cell takes the place of a grid leak in an oscillation generator circuit, and has for its principal object such an adjustment of the component parts as will stop and start oscillation in accord with the light and dark condition of the cell.

With this and other objects, the invention consists of the employment and arrangement of the several elements described in the following specifications, illustrated in the drawing, and particularly pointed out in the claim.

In the drawings A is a light-sensitive cell; B a three-element tube; and C as oscillation-generating coil coupling.

With the several parts adjusted for oscillation of the circuit when light falls on the cell, the oscillation will instantly cease when the light is cut off, because of the increase in the resistance of the cell. The output of the oscillating circuit is, therefore, intermittent, the intermittance depending upon the order of the light falling on the cell.

No means for intermittently illuminating the cell is shown as this is no part of the invention and not essential to an understanding of its operation.

What I claim, is—

The combination with an electron valve, of a circuit including input and return conductors connected respectively with the grid and filament electrodes of the valve, a variable stopping condenser in series with said input conductor, and a resistance leak in said input conductor shunted about the condenser and comprising a light sensitive cell.

In testimony whereof I have affixed my signature.

CHARLES FRANCIS JENKINS.